US008660268B2

(12) United States Patent
Schneider

(10) Patent No.: US 8,660,268 B2
(45) Date of Patent: Feb. 25, 2014

(54) KEYED PSEUDO-RANDOM NUMBER GENERATOR

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1061 days.

(21) Appl. No.: 12/111,893

(22) Filed: Apr. 29, 2008

(65) Prior Publication Data

US 2009/0271462 A1    Oct. 29, 2009

(51) Int. Cl.
H04L 29/06    (2006.01)

(52) U.S. Cl.
USPC ........... 380/262; 380/263; 380/264; 380/265; 380/266; 380/44; 380/45; 380/46; 380/47; 713/159; 713/170; 713/171; 713/172; 713/173; 713/174; 713/175; 713/182; 713/183; 713/184; 713/185; 713/186; 709/225; 709/229

(58) Field of Classification Search
USPC .............. 380/262–266, 44–47; 713/170–175, 713/159, 182–186; 709/225, 229
See application file for complete search history.

(56) References Cited

U.S. PATENT DOCUMENTS

| | | | |
|---|---|---|---|
| 5,774,552 A | 6/1998 | Grimmer | |
| 6,049,612 A * | 4/2000 | Fielder et al. | 380/44 |
| 6,073,234 A | 6/2000 | Kigo et al. | |
| 6,085,320 A | 7/2000 | Kaliski, Jr. | |
| 6,189,096 B1 | 2/2001 | Haverty | |
| 6,243,811 B1 | 6/2001 | Patel | |
| 6,401,206 B1 | 6/2002 | Khan et al. | |
| 6,792,424 B1 | 9/2004 | Burns et al. | |
| 6,883,717 B1 * | 4/2005 | Kelley et al. | 235/492 |
| 7,031,468 B2 * | 4/2006 | Hoffstein et al. | 380/28 |
| 7,073,061 B2 | 7/2006 | Asano et al. | |
| 7,194,765 B2 | 3/2007 | Blom | |
| 7,231,521 B2 | 6/2007 | Buddhikot et al. | |
| 7,242,766 B1 * | 7/2007 | Lyle | 380/2 |
| 7,363,651 B2 * | 4/2008 | de Jong et al. | 726/7 |
| 7,673,142 B2 | 3/2010 | Jeffries et al. | |
| 8,156,333 B2 | 4/2012 | Schneider | |
| 8,225,093 B2 * | 7/2012 | Fok et al. | 713/168 |

(Continued)

FOREIGN PATENT DOCUMENTS

WO    WO 2005002131    1/2005

OTHER PUBLICATIONS

Fei Xiang et al., NPL document, A New Pseudo-Random Number Generator with Application in RSA, IEEE 2008.*

(Continued)

*Primary Examiner* — Taghi Arani
*Assistant Examiner* — Josnel Jeudy
(74) *Attorney, Agent, or Firm* — Lowenstein Sandler LLP

(57) ABSTRACT

A method and apparatus for client authentication using a pseudo-random number generation system. The pseudo-random number generation utilizes a secret key as well as state information as input into the hash function to generate a pseudo-random number. The state information that is part of the input can be any number of prior generated pseudo-random numbers. The authentication allows for synchronization of the client and server by exchanging state information. The authentication is not dependent on any absolute time and consequently the client and servers are not required to maintain a reliable shared time base.

14 Claims, 5 Drawing Sheets

(56) References Cited

U.S. PATENT DOCUMENTS

| | | |
|---|---|---|
| 8,352,738 B2 | 1/2013 | Pamo et al. |
| 2002/0056040 A1 | 5/2002 | Simms |
| 2002/0146005 A1 | 10/2002 | Gallant et al. |
| 2003/0093671 A1 | 5/2003 | Owlett |
| 2003/0105964 A1 | 6/2003 | Brainard et al. |
| 2003/0233546 A1 | 12/2003 | Blom |
| 2003/0236803 A1* | 12/2003 | Williams .................. 708/252 |
| 2004/0223619 A1 | 11/2004 | Jablon |
| 2005/0081036 A1 | 4/2005 | Hsu |
| 2006/0041759 A1 | 2/2006 | Kaliski et al. |
| 2006/0235700 A1 | 10/2006 | Wong et al. |
| 2007/0005963 A1 | 1/2007 | Eldar et al. |
| 2007/0101152 A1 | 5/2007 | Mercredi et al. |
| 2007/0169181 A1 | 7/2007 | Roskind |
| 2007/0226784 A1 | 9/2007 | Ueda et al. |
| 2008/0034216 A1 | 2/2008 | Law |
| 2008/0077979 A1 | 3/2008 | Jeffries et al. |
| 2008/0155112 A1* | 6/2008 | Ma et al. .................. 709/231 |
| 2008/0301435 A1 | 12/2008 | Simon |
| 2009/0193511 A1 | 7/2009 | Noe et al. |
| 2009/0287929 A1 | 11/2009 | Kolesnikov et al. |
| 2009/0288143 A1 | 11/2009 | Stebila et al. |
| 2009/0300364 A1 | 12/2009 | Schneider |
| 2010/0058060 A1 | 3/2010 | Schneider |
| 2010/0131756 A1 | 5/2010 | Schneider |
| 2011/0131415 A1 | 6/2011 | Schneider |

OTHER PUBLICATIONS

Biryukov, Alex, et al.; Cryptanalysis of the Alleged SecurID Hash Function (extended version); Lecture Notes in Computer Science, Springer-Verlag, 2003, 18 pages.

Franka, J., et al., "RFC 2617 HTTP Authentication: Basic and Digest Access Authentication", IETF (Jun. 1999).

OATH Reference Architecture Release 2.0, Initiative for Open Authentication (2007).

USPTO; Office Action for U.S. Appl. No. 12/628,109, mailed May 9, 2013.

Office Action for U.S. Appl. No. 12/201,321 mailed Apr. 27, 2011.

Bellare, Mihir, et al., "Keying Hash Functions for Message Authentication", ,http://cseweb.uscd.edu/~mihir/papers/kmd5.pdf.. Published Jun. 1996.

USPTO, Office Action for U.S. Appl. No. 12/324,108, mailed Feb. 29, 2012.

USPTO; Office Action for U.S. Appl. No. 12/628,109, mailed Sep. 4, 2012.

USPTO; Office Action for U.S. Appl. No. 12/628,109, mailedJan. 22, 2013.

Office Action for U.S. Appl. No. 12/156,278, mailed Sep. 26, 2011.

Notice of Allowance for U.S. Appl. No. 12/156,278, mailed Nov. 23, 2011.

Office Action for U.S. Appl. No. 12/201,321 mailed Oct. 13, 2011.

Office Action for U.S. Appl. No. 12/324,108, mailed Nov. 16, 2011.

* cited by examiner

KEYED PSEUDO-RANDOM NUMBER GENERATOR

TECHNICAL FIELD

Embodiments of the present invention relate to secured communication. Specifically, the embodiments of the present invention relate to a method and system for generating pseudo-random numbers for use in an authentication process.

BACKGROUND

Pseudo-random token codes are utilized to enhance the security of systems by making the authentication of users to a system contingent on a timed generation of a pseudo-random token code. A user submits the pseudo-random token code with a personal identification number to an authentication server to obtain access to the resources of a system. The pseudo-random token code and personal identification number provided by a user machine or application are checked by the authentication server, which also generates the same pseudo-random token code and has the personal identification code on file, to authenticate the user and grant access to system resources.

A specialized device in the form of a token, which is a small handheld device, is used to generate the pseudo-random token code. The token card displays the pseudo-random token code in a small display for a short period of time before clearing the displayed code and presenting a new pseudo-random token code. The pseudo-random token codes are only valid during a short time that they are displayed (e.g., 30 seconds). A hash function that generates the pseudo-random token code takes a current time and a secret key as inputs. The secret key is provided to the token by the manufacturer and then provided to the authentication server. This scheme makes the authentication system very time sensitive. If an authentication server and token have clocks that diverge, the system quickly breaks. Also, the security of the leading hash function, used in the SecurID by RSA Security of Bedford, Mass. has been called into question.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for client authentication using a pseudo-random number generation system. The pseudo-random number generation utilizes a secret key as well as state information as input into the hash function to generate a pseudo-random number. The state information that is part of the input can be any number of prior generated pseudo-random numbers. The authentication allows for synchronization of the client and server by exchanging state information. The authentication is not dependent on any absolute time and consequently the client and servers are not required to maintain a reliable shared time base.

Figure 1:
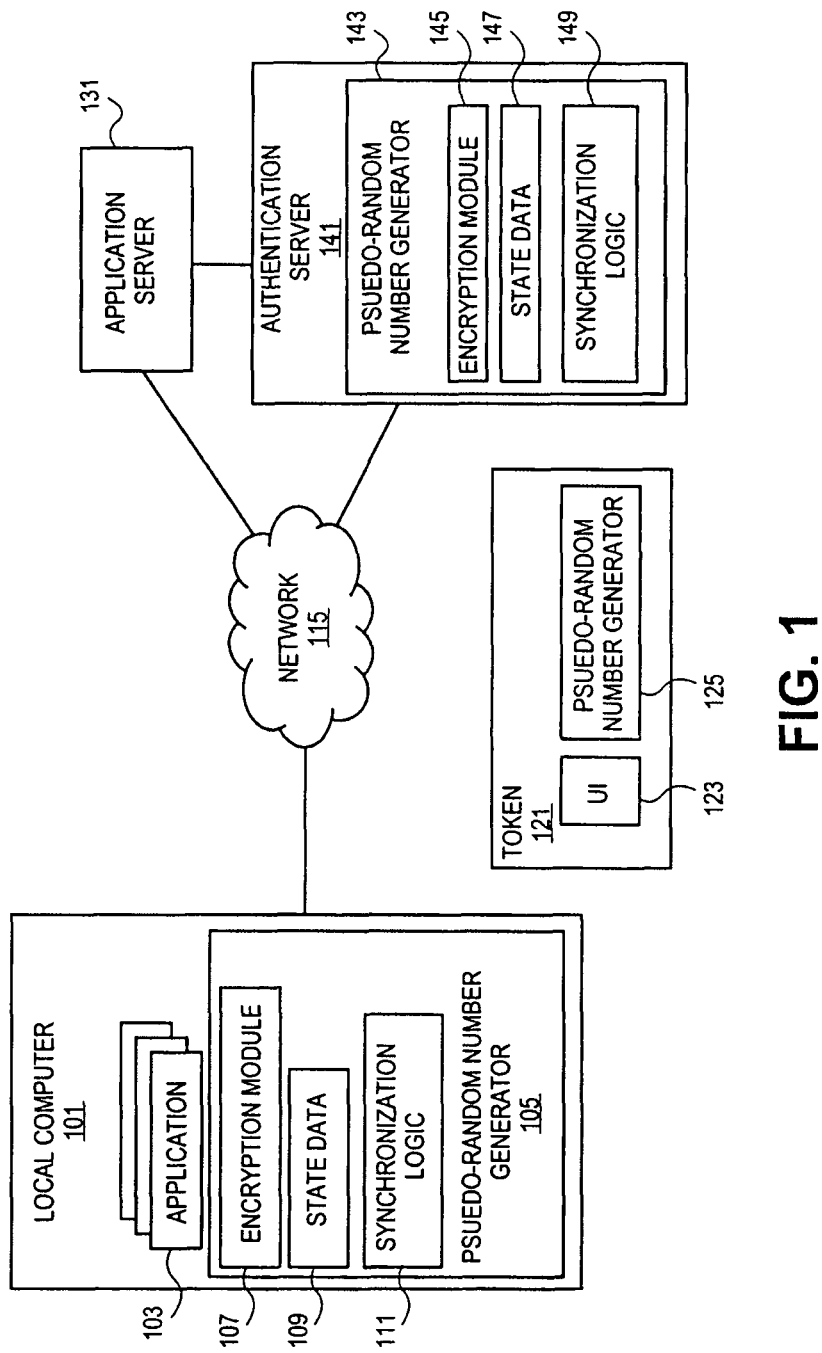
FIG. 1 is a diagram of one embodiment of a system for authentication using a pseudo-random number generation scheme.

FIG. 1 is diagram of one embodiment of the authentication system using pseudo-random number generation. The system can include a local computer 101, token 121, application server, 131 authentication server 141 and similar systems and components. Any number of computers, tokens or other devices can be connected to the authentication server 141 to request access to resources safeguarded by the authentication server 141. Any number of resources can be safeguarded by a single authentication server 141 or set of authentication servers. As used herein, the term 'set' refers to any whole positive number of items including one item.

The components of the system including the local computer 101, application server 131 and authentication server 141 may be in communication with one another over a network 115. The network can be a local area network (LAN), a wide area network (WAN), for example the Internet, or a similar network. The network 115 can include wireless and wired components.

A local computer 101 can include any number of applications 103, a pseudo-random number generator 105 and similar components. The applications 103 can be any type of application such as a word processing application, browser or similar applications. The applications 103 can request resources from or interact with an application server 131 or similar resource provider over the network 115. To access the application server 131 the user or local computer 131 must be authenticated by the authentication server 141. The applications 103 can also request other types of resources that are safeguarded by the authentication server 141. To access the resources safeguarded by the authentication server 141, a user must provide a pseudo-random number that matches a pseudo-random number generated by the authentication server 141 along with a personal identification number that matches a personal identification number on file for the user with the authentication server 141.

The pseudo-random number generator 105 is utilized by applications 103 and similar components of the local computer 101 to obtain the pseudo-random number necessary for receiving authentication from the authentication server 141 and gaining access to the resources safeguarded by the authentication server 141. The pseudo-random generator 105 includes the elements of an encryption module 107, state data 109 and synchronization logic 111.

The encryption module 107 encompasses a hash function or similar ciphering function that generates a pseudo-random number based on input data. The input data can include state data and a secret key. The secret key can be a key provided by the manufacturer, a personal identification number or similar value specified by a user or similar secret key that is stored within the state data 109. The function of the encryption module 107 is to generate the pseudo-random number and is discussed in greater detail in regard to FIG. 3.

The state data 109 is a data structure and logic that tracks a number of variables. The variables can include a current time, duration of time that the encryption module or pseudo-random number generator has been operating, number of iterations of the encryption module or pseudo-random number generator 105, a set of previously generated values from the pseudo-random number generator and similar information. The set of state data 109 that is tracked can be fixed by a manufacturer or configurable depending on the security requirements of the system. The more different types of state data that are tracked and utilized by the encryption module 107, generally, the better the security.

The synchronization logic 111 allows the pseudo-random number generator 105 to synchronize with the pseudo-random number generator 143 of the authentication server 141. The synchronization logic 111 allows the pseudo-random number generator 105 to avoid failed authentication due to divergence between state data 109 on the local computer 101 and state data 109 at the authentication server 141. Such divergence may occur when the current time tracked by either the local computer or the authentication server differs, when the number of iterations of or the duration of operation time for the pseudo-random number generator 105 and pseudo-random number generator 143 differ or similar circumstances occur. The synchronization logic 111 exchanges state data with the authentication server to correct these divergences and ensure proper authentication.

A token 121 is a device that can provide a pseudo-random number generator 125 separate from the local computer 101. The token 121 can be used in place of a software based pseudo-random number generator 105 provided on the local computer 101. In one embodiment, the token 121 continually updates its pseudo-random number that is displayed through a user interface 123.

In another embodiment, the user interacts with the token 121 through the user interface 123 to provide a personal identification number. The user can then obtain the pseudo-random number from the token card and input it into the local computer 101 to obtain authentication from the authentication server 141. In this embodiment, the current valid pseudo-random number is only displayed upon entry of the correct personal identification number or passphrase.

In some embodiments, the token 121 may not be able to synchronize with the authentication server automatically. In other embodiments, the token 121 has wireless or wired connection capability that allows it to connect either through the local computer 101 or directly through the network 115 with the authentication server 141 to synchronize state data through the pseudo-random number generator 125 and the pseudo-random number generator 143 of the authentication server 141.

The authentication server 141 can include a pseudo-random number generator 143 that is similar to or a mirror of the pseudo-random number generator 105 on the local computer 101 or pseudo-random number generator 125 on the token 121. Pseudo-random number generator 143 includes an encryption module 145, state data 147 and synchronization logic 149. The encryption module 145 utilizes the same cipher function that is utilized by the encryption module 107 on the local computer 101. State data 147 is maintained independent of the state data 109 on the local computer 101. However, the state data 147 that is tracked mirrors or replicates the state data 109 tracked on the local computer 101. State data 147 can include any number of previously generated pseudo-random numbers, a current time (relative or absolute), a time interval over which the pseudo-random number generator 143 has operated, a number of iterations of the pseudo-random number generator 143 and similar state data. Synchronization logic 149 operates in a manner complementary to the synchronization logic 111 of the local computer 101. The function of the synchronization logic 111 is described further in relation to the authentication process described in FIG. 4.

Figure 2:
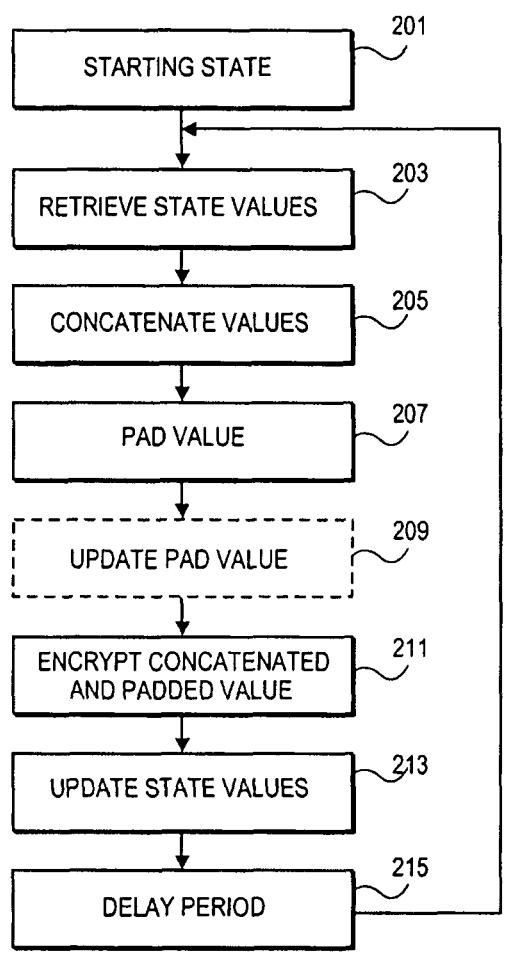
FIG. 2 is a flowchart of one embodiment of a process for updating the pseudo-random number values over time.

FIG. 2 is a flowchart of one embodiment of the process for maintaining or generating a pseudo-random number. In one embodiment, the currently valid pseudo-random number is periodically updated. The current pseudo-random number may be valid for a pre-defined time period. An example time period can be thirty seconds or one minute, thereby giving the user sufficient time to input the number and sufficient time for the local computer and authentication server to exchange the pseudo-random number over a network.

The pseudo-random number generator can have a default or original state. Since the pseudo-random number generator, more specifically the encryption module or hashing function of the pseudo-random number generator, relies on previously generated values, to generate the first generated value, a set of default values are utilized as part of the state data that is input into the encryption module (block 201). The starting state data is provided to the pseudo-random number generator on local computer or token and authentication server, identically. In another embodiment, this original starting data may be shared through a synchronization operation to ensure that the local pseudo-random number generator and the authentication server pseudo-random number generator are operating with the same state data.

The process continues by retrieving the state values upon which the generation of the first pseudo-random number is to be based (block 203) Retrieved state data can include previously generated pseudo-random numbers as well as a current time, length of algorithm operating time or number of iterations performed since the beginning of the algorithm, secret key, prior pad values and similar state data. In one embodiment, two prior pseudo-random numbers are utilized to generate the next pseudo-random number, the two prior values can be two immediately prior or preceding generating values or can be any two previously generated values. In other embodiments, more than two values are utilized. For sake of clarity the description herein utilizes the example of using the two immediately preceding generated pseudo-random numbers.

In one example, the goal is to generate a nine digit pseudo-random number every thirty seconds using the data encryption standard (DES) as a block cipher. This requires the use of 30 bits of each of two prior pseudo-random numbers utilized as an input. Thus, 30 bits of the two prior outputs expressed as binary strings are concatenated to create a 60 bit string (block 205). However, the block cipher DES requires a 64 bit input. The remaining 4 bits are a padded value. The padded value is added into the concatenated value (block 207). The padded values can be added to any part of the concatenated value. They can be inserted into the middle of the value or the end of the value to create a 64 bit string, which is then passed to the block cipher. In one embodiment, the padded value may change with each iteration of the pseudo-random number generator. For example, the padded value can be incremented each iteration or similarly modified. In other embodiments, the padded value remains constant. In a further embodiment, the position of the padded value can also be altered in the overall string.

After the padded value is inserted, the padded value may be updated (dependent on the embodiment) and stored in the state data (block 209). The encryption module then receives the concatenated and padded value and executes a cipher on this value (block 211). For example, if the DES block cipher is utilized on the example 64 bit value then a new 64 bit value is generated. To obtain the desired 9 digit value, the value generated by the block cipher can be truncated. For example, the 64 bit output can be divided by 1,000,000,000 and the resulting remainder utilized as the pseudo-random number.

The newly generated value is then stored in the state data replacing one of the older prior values (block 213). In one embodiment, the oldest prior or tracked pseudo-random number is replaced. In other embodiments, more complicated schemes can be utilized for replacement of prior or stored pseudo-random numbers with a new pseudo-random number. Any other relevant state data can also be updated at this time. Some state data may be updated by other processes, such as a current time, which would be maintained as a separate process.

A delay count is then started (block 215). The delay can be of any length. For example, the delay may be 30 seconds or one minute to provide a user with sufficient time to send the pseudo-random number to the authentication server along with a personal identification number, passphrase or any other authenticating data. In some embodiments, no additional authentication data is provided and the pseudo-random number itself is relied upon for authentication. Once the delay period has expired the update process for the pseudo-random number begins again (block 205).

Figure 3:
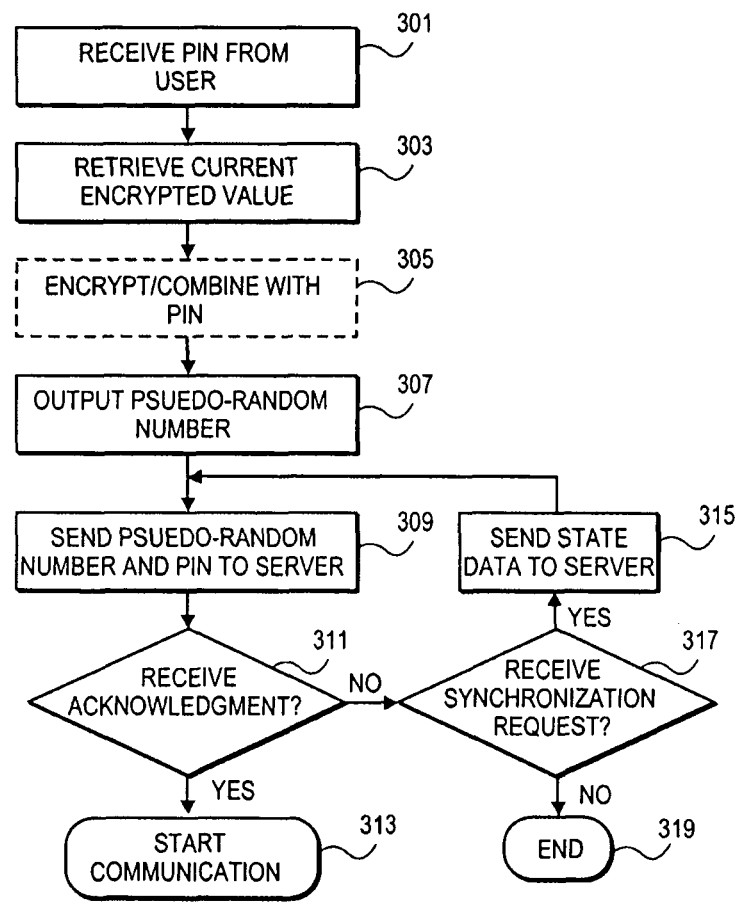
FIG. 3 is a flowchart of one embodiment of a process for providing a pseudo-random number and personal identification number to an authentication server by a client requesting authentication.

FIG. 3 is a flowchart of one embodiment of a process for authentication performed by the pseudo-random number generator or similar component on the client side. In one embodiment, an application or similar component of a local computer relies on the pseudo-random number generator component to perform the authentication process. In another embodiment, the application or a separate authentication module performs the authentication request in conjunction with the pseudo-random number generator. The functionality of the pseudo-random number generator including its tracking of state data, encryption and synchronization processes could be redistributed across an application, separate authentication module or similar component. For sake of clarity, an embodiment where the authentication is performed by the pseudo-random number generator is described. One skilled in the art would understand that the principles and operations described in relation to this embodiment is also applicable to the other embodiments.

In one embodiment, the authentication process is initiated in response to receiving a personal identification number, passphrase or similar information from the user. The received personal identification number or passphrase can be any value and have any format and size. The personal identification number or passphrase can be used to control access to the current valid pseudo-random number. In some embodiments, the personal identification number or passphrase can be used in the hash function or similar algorithm that generates the pseudo-random number. In other embodiments, the use of a personal identification number or passphrase is not utilized or relied upon. In these embodiments, other authentication data is utilized or the pseudo-random number generation itself is relied on for authentication.

In the embodiments where the personal identification number or passphrase is utilized as input into the generation of the pseudo-random number, the personal identification number or passpharase can be combined with other state data in various manners. In one example embodiment, the current pseudo-random number is generated by retrieving an encrypted value generated by the process described above in regard to FIG. 2 (block 303). The retrieved encrypted value is then combined with the personal identification number or passphrase using another cipher algorithm to generate the pseudo-random number (optional block 305). In this embodiment, the final pseudo-random number may not be utilized as an input to the process of FIG. 2, rather the intermediate value produced by that process would be utilized. The generated pseudo-random number is output by the pseudo-random number generator (block 307).

In the embodiments, where the personal identification number or passphrase is not utilized in generating the pseudo-random number, the current valid pseudo-random number is retrieved from its storage location as it was produced by the process or FIG. 2 or it is input by a user (e.g., when it is generated by a token) (block 303). The retrieved pseudo-random number is output by the pseudo-random number generator (block 307). If the pseudo-random number is generated by a token, then it is output to a display device and then the user must copy that pseudo-random number to an input on a local computer.

The pseudo-random number and personal identification number or passphrase are then sent to the authentication server (block 309). The process then waits to receive an acknowledgment from the authentication server indicating that the authentication request has been approved (block 311). If an acknowledgment of a successful authentication is received, then the standard communication is initiated allowing the user to access the secured resources protected by the authentication server (block 313). If a successful acknowledgment is not received within a defined period or a negative acknowledgment is received, then the process determines whether a synchronization request has been received from the authentication server (block 317). A time out period may be initiated or similar limits may be placed on a duration of time during which an acknowledgment or synchronization request can be received. If no synchronization request is received, then the process ends and the authentication process is unsuccessful (block 319). If a synchronization request is received during the defined time period from the authentication server, then the process sends the current state data to the authentication server (block 315). The specific state data can vary. In one embodiment, the state data includes the previous two or more pseudo-random numbers generated by the process. In other embodiments, the initial pseudo-random number default values are provided and the number of iterations performed since the initiation of the pseudo-random number generation process is provided to allow the authentication server to recreate the current state of the pseudo-random number generator on the client. The process can then resend the pseudo-random number and personal identification number to the authentication server or can await a successful acknowledgment signal (block 309 and block 311).

Figure 4:
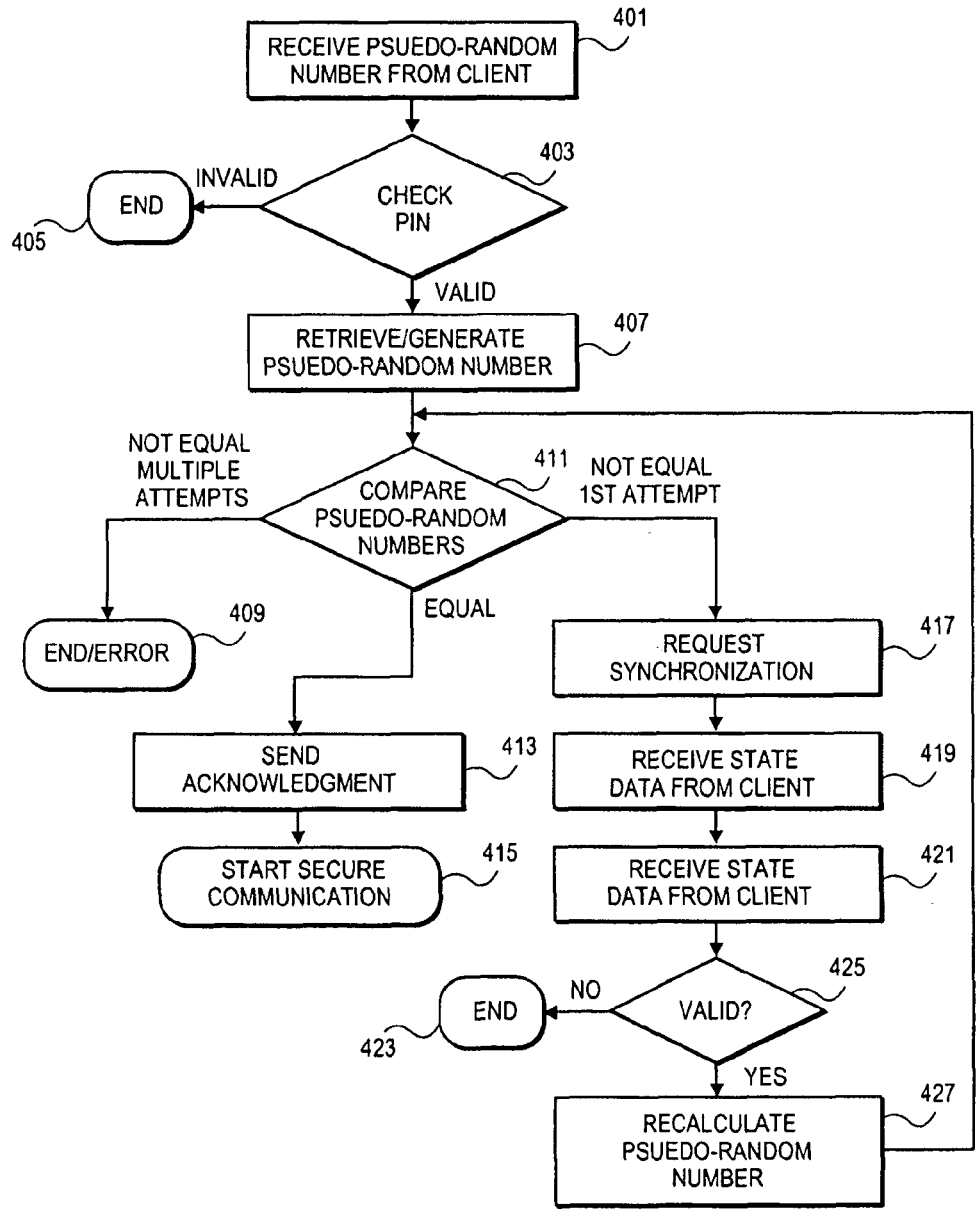
FIG. 4 is a flowchart of one embodiment of a process for authenticating a pseudo-random number and PIN received from a client at the authentication server.

FIG. 4 is a diagram of one embodiment of a process for authentication of a client request, including a pseudo-random number and personal identification number, that is performed by the authentication server. The process may be initiated upon receipt of a pseudo-random number and personal identification or passphrase number from a client (block 401). In other embodiments, a personal identification number or passphrase are not received and not relied upon for authentication. In response to receiving the pseudo-random number from the client, the authentication server verifies the personal identification number or passphrase against a stored personal identification number or passphrase associated with that user or client machine (block 403). If the supplied personal identification number or passphrase is not valid, then the authentication process is aborted (block 405). In some embodiments, a negative acknowledgment is sent to the requesting client.

If the personal identification number or passphrase is valid, then the pseudo-random number of the authentication server is retrieved (block 403). The pseudo-random number is generated via the process described in regard to FIG. 2. In another embodiment, the pseudo-random number is generated in part based on the personal identification number or passphrase. In these embodiments, an initial step analogous to that described in regard to FIG. 3 is performed on a retrieved encrypted value to generate the pseudo-random number.

The pseudo-random number received from the client is then compared with the generated or retrieved pseudo-random number (block 411). If the two pseudo-random numbers are not equal and multiple attempts have been made to compare the two pseudo-random numbers including a synchronization between comparisons, then the process is ended and an error is reported (block 409). If the pseudo-random numbers are equal, then an acknowledgment is sent to the client indicating that the authentication process has been successful (block 413). The acknowledgment can include any encrypted or open text message. The acknowledgment is followed by establish a secure communication channel or establishing permissions to allow the client access to resources protected by the authentication server (block 415). In other embodiments, this comparison of the pseudo-random number is the primary authentication method and a personal identification number or passphrase are not relied upon.

However if the pseudo-random numbers are not equal, then a determination is made whether or not this is the first attempt to compare the client pseudo-random number with the authentication server pseudo-random number or whether a synchronization has been attempted previously. If no previous synchronization or comparison attempts have previously been made, then a request for synchronization of state data is initiated (block 417). The request may be a message sent to the client for a set of predetermined state data or a request specifying the state data. The process then waits for a reply to the request for state data. In one embodiment, a time out may be started during which a request must be replied to. In another embodiment, the synchronization request does not have a defined time period. The process continues issuing a synchronization request until receipt of state data from the client (block 419). The received state data is then stored locally and associated with the client requesting authentication (block 421). In one embodiment the received state data may be associated with a user or a specific client machine. A check is then made to determine whether the received state data is valid (block 425). The validity of the state data may be determined based on a search of possible pseudo-random numbers based on known or received initial state values or similar validity checks may be made. If the received state data is not valid, then the process is ended (block 423). However, if the received state data is valid, then the pseudo-random number of the authentication server is recalculated (block 427). The process then continues by comparing the pseudo-random numbers (block 411).

Figure 5:
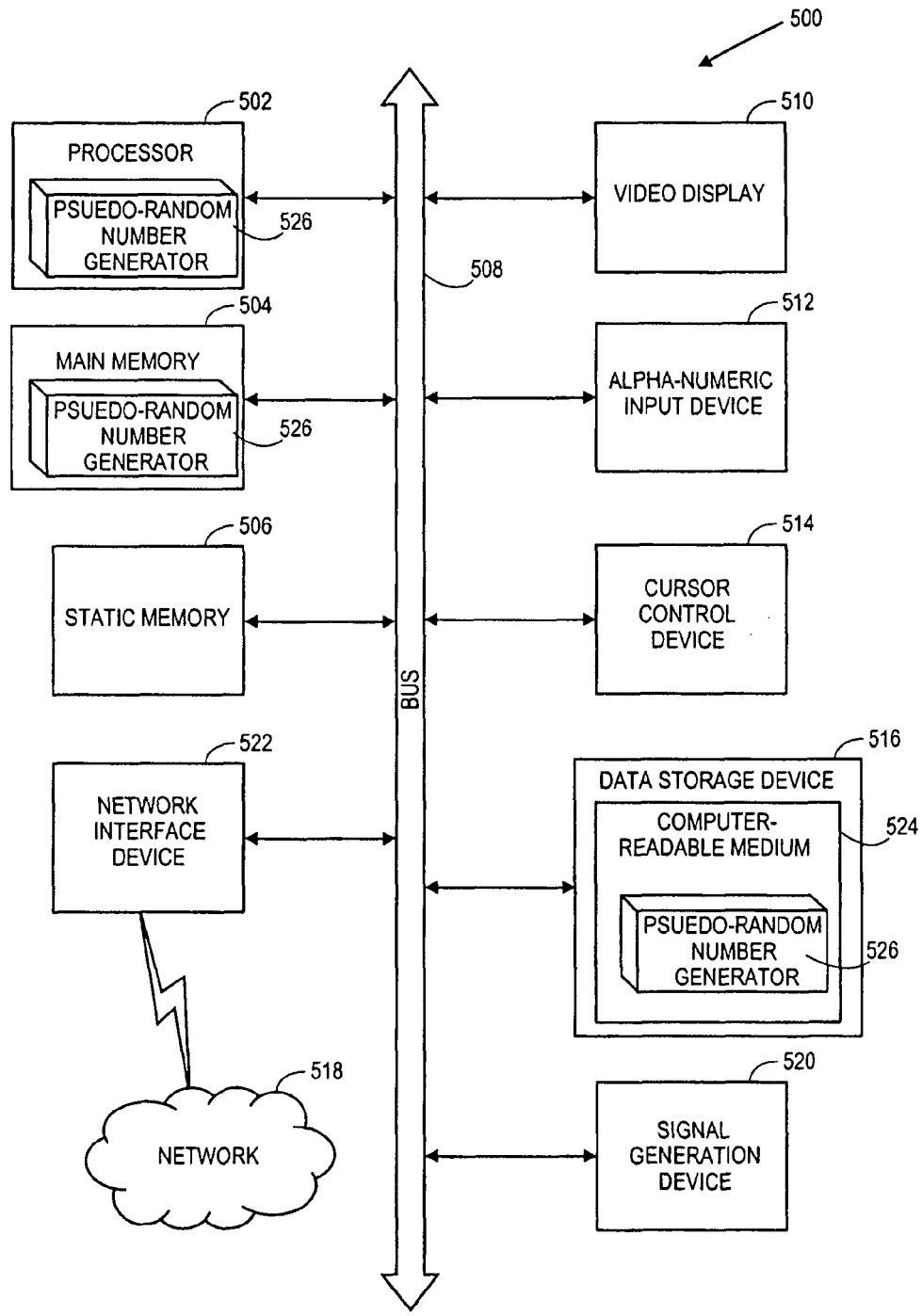
FIG. 5 is a diagram of one embodiment of a computer system for providing either the client or server pseudo-random number generation.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine (e.g., the computer executing the client side pseudo-random number generator or the authentication server pseudo-random number generator) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 616 (e.g., a data storage device in the form of a drive unit, which may include fixed or removable computer-readable medium), which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the management station logic or agent logic 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., management station logic or agent logic 526) embodying any one or more of the methodologies or functions described herein. The logic 526 may also reside, completely or at least partially, within the main memory 504 and/or within the processing device 502 during execution thereof by the computer system 500, the main memory 504 and the processing device 502 also constituting machine-readable storage media. The logic 526 may further be transmitted or received over a network 518 via the network interface device 522.

The machine-readable storage medium 524 may also be used to store the management station logic and agent logic 526 persistently. While the machine-readable storage medium 524 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "retrieving," "encrypting," "truncating," "replacing," "calculating," "recalculating," "comparing," "validating," "authenticating" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for generating a pseudo-random number for use in an authentication process has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
retrieving state data comprising at least a first pseudo-random value and a second pseudo-random value, wherein each of the first pseudo-random value and second pseudo-random value are generated by encrypting and truncating other pseudo-random values;
encrypting, by a processing device, a combination of at least the first pseudo-random value and the second pseudo-random value using a key to produce an output value;
truncating the output value to generate a third pseudo-random value;
comparing the third pseudo-random value with another pseudo-random value generated by a device requesting authentication; and
requesting synchronization of state data from the device requesting authentication, in response to a failed comparison of the third pseudo-random value and the pseudo-random value generated by the device.

2. The computer-implemented method of claim 1, further comprising:
replacing the first pseudo-random value with the third pseudo-random value; and
calculating a fourth pseudo-random value based at least on the second pseudo-random value and third pseudo-random value.

3. The method of claim 1, further comprising:
receiving a personal identification number as an input from a user.

4. The method of claim 1, further comprising:
validating the state data from the device.

5. The method of claim 1, further comprising:
recalculating the third pseudo-random value based on the state date received from the device.

6. The method of claim 1, further comprising:
authenticating a request in response to a successful comparison of the third pseudo-random value and the pseudo-random value generated by the device.

7. The method of claim 1, further comprising:
receiving a request for the state data from an authentication server; and
sending the state data to the authentication server.

8. A non-transitory computer readable storage medium, having instructions stored therein, which when executed, cause a processing device to perform a set of operations comprising:
retrieving state data comprising at least a first pseudo-random value and a second pseudo-random value, wherein each of the first pseudo-random value and second pseudo-random value are generated by encrypting and truncating other pseudo-random values;

encrypting, by a processing device, a combination of at least the first pseudo-random value and the second pseudo-random value using a key to produce an output value;

truncating the output value to generate a third pseudo-random value;

comparing the third pseudo-random value with another pseudo-random value generated by a device requesting authentication; and requesting synchronization of state data from the device requesting authentication, in response to a failed comparison of the third pseudo-random value and the pseudo-random value generated by the device.

9. The non-transitory computer readable storage medium of claim 8, having further instructions therein, which when executed, cause the computer to perform a further set of operations, further comprising:

replacing the first pseudo-random value with the third pseudo-random value; and calculating a fourth pseudo-random value based at least on the second pseudo-random value and third pseudo-random value.

10. The non-transitory computer readable storage medium of claim 8, having further instructions therein, which when executed, cause the computer to perform a further set of operations, further comprising:

receiving a personal identification number as an input from a user.

11. The non-transitory computer readable storage medium of claim 8, having further instructions therein, which when executed, cause the computer to perform a further set of operations, further comprising:

validating the state data from the device.

12. The non-transitory computer readable storage medium of claim 8, having further instructions stored therein, which when executed perform a further set of operations, further comprising:

recalculating the third pseudo-random value based on the state date received from the device.

13. The non-transitory computer readable storage medium of claim 8, having further instructions stored therein, which when executed perform a further set of operations, further comprising:

authenticating a request from a client in response to a successful comparison of the third pseudo-random value and the pseudo-random generated by the device.

14. A system comprising:

a memory;

a processing device coupled to the memory;

an encryption module executable from the memory by the processing device;

a pseudo-random number generator module executable from the memory by the processing device and coupled to the encryption module, the pseudo-random number generator module to generate a third pseudo-random number by calling the encryption module to encrypt a combination of at least a first prior pseudo-random output value and a second prior pseudo-random output value, wherein the first prior pseudo-random output value and the second prior pseudo-random output value are generated by encrypting and truncating other pseudo-random values;

a state data tracker module executed from the memory by the processing device and coupled to the pseudo-random number generator module, the state data tracker module to maintain a time value and values of the at least first prior pseudo-random output value and second prior pseudo-random output value; and a synchronization module executed from the memory by the processing device and coupled to the pseudo-random number generator module to synchronize the state data with state data of another computer.

* * * * *